United States Patent [19]

Gaiser

[11] 4,441,320
[45] Apr. 10, 1984

[54] FAST-FILL MASTER CYLINDER

[75] Inventor: Robert F. Gaiser, Stevensville, Mich.

[73] Assignee: The Bendix Corporation, Southfield, Mich.

[21] Appl. No.: 262,075

[22] Filed: May 11, 1981

Related U.S. Application Data

[63] Continuation of Ser. No. 42,699, May 25, 1979, abandoned.

[51] Int. Cl.³ .............................................. B60T 11/08
[52] U.S. Cl. ........................................ 60/578; 60/562; 60/589
[58] Field of Search ................ 60/562, 574, 578, 588, 60/589, 592

[56] References Cited

U.S. PATENT DOCUMENTS

| | | | |
|---|---|---|---|
| 2,245,991 | 6/1941 | Loweke | 60/588 |
| 2,289,525 | 7/1942 | Swift | 60/578 |
| 2,396,155 | 3/1946 | Christensen | 60/588 |
| 2,569,025 | 9/1951 | Schultz | 60/588 |
| 3,307,667 | 3/1967 | Maurice | 60/588 |
| 3,667,229 | 6/1972 | Cresto | 60/578 |
| 4,027,482 | 6/1977 | Manzini | 60/578 |
| 4,170,386 | 10/1979 | Shutt | 60/574 |

FOREIGN PATENT DOCUMENTS

| | | | |
|---|---|---|---|
| 483526 | 8/1953 | Italy | 60/562 |
| 626073 | 7/1949 | United Kingdom | 60/588 |

Primary Examiner—Abraham Hershkovitz
Attorney, Agent, or Firm—Paul David Schoenle; Ken C. Decker

[57] ABSTRACT

A master cylinder includes a housing defining a reservoir and a bore for movably receiving a pair of pistons. A primary piston cooperates with a secondary piston to define a primary chamber therebetween and cooperates with the housing to substantially define an auxiliary chamber. The primary chamber and auxiliary chamber are disposed within a substantially uniform diameter section of the housing bore. The primary piston is movable within the bore to communicate fluid pressure from the auxiliary chamber to the primary chamber until a predetermined pressure level is reached in the primary chamber whereupon the auxiliary chamber is vented to the reservoir. A sealing member disposed within a recess on the bore cooperates with the piston to define the auxiliary chamber. Upon initial movement of the piston relative to the sealing member, a small portion of the fluid within the auxiliary chamber is communicated to the reservoir so as to bleed the auxiliary chamber. Further movement of the piston relative to the sealing member closes the auxiliary chamber to the reservoir and communicates pressurized fluid from the auxiliary chamber to the primary chamber. The sealing member is disposed within a recess on the wall of the housing bore and the recess leads to an opening communicating with the reservoir.

5 Claims, 4 Drawing Figures 4,441,320

FAST-FILL MASTER CYLINDER

BACKGROUND OF THE INVENTION

This is a continuation of application Ser. No. 42,699, filed May 25, 1979, and presently abandoned in favor of this application.

A fast-fill or quick take-up master cylinder permits larger brake lining clearances with a rotatable member so that lining drag is substantially eliminated. Such a master cylinder provides a housing with a stepped bore and a primary piston sealingly engages the stepped bore at a small diameter section and a large diameter section to substantially define a quick take-up chamber. When the piston is moved during a braking application, fluid within the quick take-up chamber is pressurized in response to contraction of the quick take-up chamber and communicated via a suitable passage to a primary chamber.

During the manufacture of the quick take-up master cylinder it is critical to maintain the concentricity between the small diameter section of the stepped bore and the large diameter section of the stepped bore. The primary piston sealingly engages both sections and is movably disposed within both sections so that any eccentricity between the sections will cause the primary piston to wedge within the stepped diameter bore.

SUMMARY OF THE INVENTION

A fast-fill master cylinder includes a housing defining a reservoir and having a bore for movably receiving a primary piston and a secondary piston. The housing bore is substantially uniform in diameter. The primary piston sealingly engages the bore at a first section and at a second section. A sealing member is disposed within a recess on the wall of the bore to remain fixed relative to the bore. The recess is between the first section and the second section and leads to an opening communicating with the reservoir. The primary piston cooperates with the housing and the secondary piston to substantially define a primary chamber and also cooperates with the sealing member and housing to substantially define an auxiliary or fast-fill chamber.

In a rest position the sealing member cooperates with the piston or housing to open communication between the reservoir and auxiliary chamber. The reservoir and auxiliary chamber remain open during initial movement of the piston relative to the sealing member so as to bleed the auxiliary chamber to the reservoir. Further movement of the piston relative to the sealing member closes communication between the auxiliary chamber and the reservoir and communicates fluid from the auxiliary chamber to the primary chamber. When a predetermined pressure level is reached within the primary chamber, the auxiliary chamber is either vented or metered to the reservoir. Upon termination of braking, the piston retracts to its rest position and the sealing member provides for communication of fluid from the reservoir to the auxiliary chamber to replenish the latter.

It is an object of the present invention to provide a fast-fill or quick take-up master cylinder having a bore which is substantially uniform in diameter so that a primary piston within the bore can move relative to a sealing member to communicate fluid pressure from the auxiliary chamber to the primary chamber during a braking application.

It is another object of the present invention to bleed the auxiliary chamber to the reservoir upon initial movement of the piston relative to the sealing member and to fix the latter axially relative to the bore.

DETAILED DESCRIPTION

Figure 1:
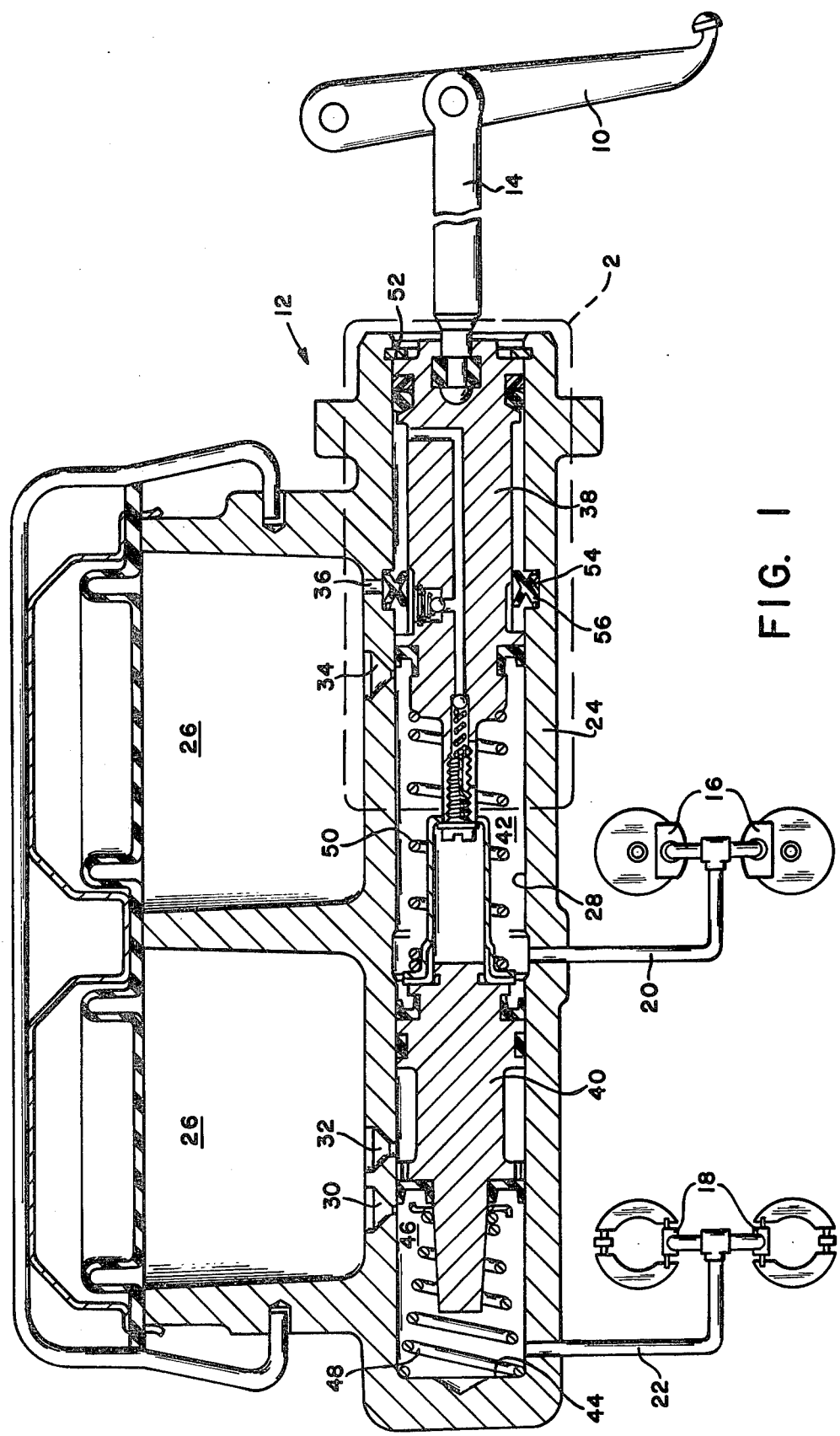
FIG. 1 is a schematic illustration of a braking system having a master cylinder in cross section constructed in accordance with the present invention.

In the brake system of FIG. 1, a brake pedal 10 is coupled to a master cylinder 12 via an input rod 14 and the master cylinder 12 communicates with brake assemblies 16 and 18 via conduits 20 and 22, respectively. When the pedal 10 is actuated by a vehicle operator the input rod is moved into the master cylinder to generate fluid pressure in a manner hereinafter described so that the generated fluid pressure is communicated via conduits 20 and 22 to their respective brake assemblies, thereby effecting a brake application.

The master cylinder 12 includes a housing 24 defining a split reservoir at 26. The reservoir communicates with a bore 28 via ports or openings 30, 32, 34, and 36. The bore 28 movably receives a primary piston 38 coupled to the input rod 14 and a secondary piston 40. The primary piston 38 cooperates with the secondary piston 40 to substantially define a primary chamber 42 therebetween and the secondary piston cooperates with the end wall 44 of bore 28 to substantially define a secondary chamber 46. The primary chamber 42 communicates with conduit 20 and the secondary chamber 46 communicates with conduit 22. A first spring 48 biases the secondary piston 40 away from end wall 44 and a second spring 50 biases the primary piston 38 away from secondary piston 40 against a snap ring 52 to define a rest position for the primary piston 38.

Figure 2:
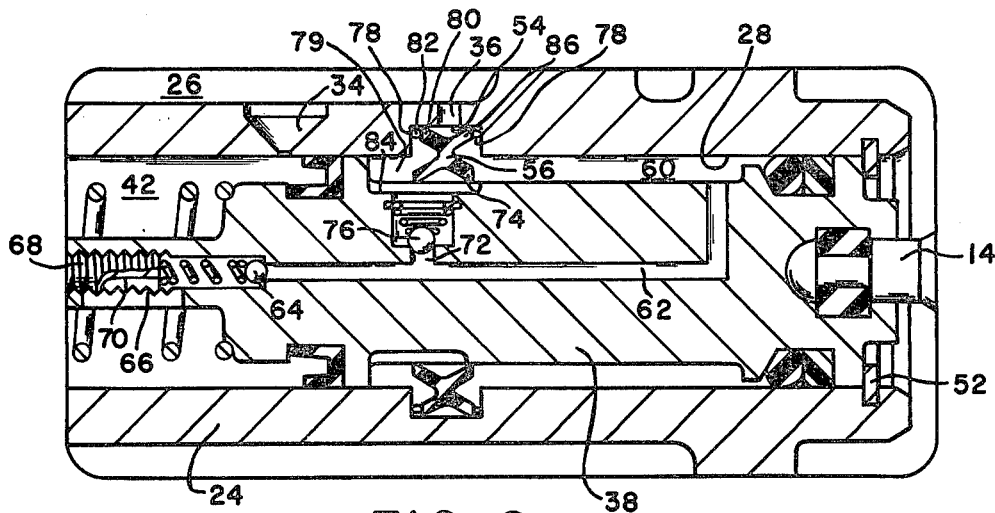
FIG. 2 is an enlarged view of the encircled portion of FIG. 1.

In accordance with the invention the bore 28 is substantially uniform in diameter except for a recess 54 which receives a sealing member 56. Turning to FIG. 2, the piston 38 cooperates with sealing member 56 and the bore 28 to substantially define an auxiliary chamber 60. The portion of the bore 28 surrounding auxiliary chamber 60 includes the same diameter as the remaining portion of the bore 28. A first passage 62 within the piston 38 includes a first check valve 64 adjacent a threaded bore 66 which receives a stem 68. The stem is cut out at 70 to enable the first passage 62 to communicate with the primary chamber 42. A second passage 72 intersects the first passage 62 and opens to the bore 28 on the side of sealing member 56 opposite auxiliary chamber 60. The second passage 72 could also open to the bore at the sealing member 56 provided the passage 72 terminates at a location to the left of the inner right lip 74 of sealing member 56. A second check valve 76 is disposed within passage 72 and its associated spring is stronger than the associated spring of check valve 64 so that check valve 64 will always open before check valve 76, if both check valves are exposed to the same pressure.

The sealing member 56 is substantially X-shaped with a plurality of tabs 78 projecting from the radially outer lips 80 and 86. The plurality of tabs 78 on lip 80 abut the wall of recess 54 to form an aperture 82 communicating the bore 28 with the reservoir 26 via opening 36. The plurality of tabs 78 on lip 86 permit fluid communication from a chamber 79 to auxiliary chamber 60 when braking is terminated and the piston is returning toward snap ring 52. In addition, the piston 38 is recessed at 84 to open communication between the auxiliary chamber 60 and the reservoir via recess 84, aperture 82 and opening 36, when the piston is abutting snap ring 52. As the axial length of the recesses 84 is only slightly larger than the axial length of sealing member 56, movement of the piston 38 toward the primary chamber 42 will close the recesses 84 from the auxiliary chamber after a slight amount of piston movement.

MODE OF OPERATION

When the brake pedal 10 is actuated, the input rod 14 and piston 38 are moved to the left, viewing FIG. 2, to contract the volume of fluid within auxiliary chamber 60. Initial movement of the piston to the left relative to the sealing member 56 causes fluid within the auxiliary chamber to flow to reservoir 26 via recesses 84, chamber 79, aperture 82 and opening 36. Consequently, a small portion of the fluid in auxiliary chamber 60 may be bled to the reservoir or to the chamber 79 upon initial movement of the piston 38. Further movement of the piston closes the recesses 84 at lip 74 to increase fluid pressure within auxiliary chamber 60 as well as in primary chamber 42. The increased pressure within auxiliary chamber 60 is communicated via passage 62 to check valve 64 to offset the pressure acting against the check valve from primary chamber 42 plus the associated spring of check valve 64 so as to open check valve 64. Thereafter, increasing fluid pressure within auxiliary chamber 60 is communicated to the primary chamber 42 until a predetermined pressure level is reached in the primary chamber or passage 62. When the predetermined pressure level is reached, check valve 76 is opened to vent the auxiliary chamber to the reservoir via aperture 82 and opening 36.

The increased fluid pressure communicated to the primary chamber cooperates with the contraction of spring 50 to move secondary piston 40 so as to pressurize fluid within secondary chamber 46. Consequently, fluid pressure within the primary and secondary chambers is communicated via conduits 20 and 22 to respective brake assemblies 16 and 18 to effectuate braking.

Upon termination of braking, the springs 48 and 50 bias the pistons 40 and 38 to return to their rest positions. Primary piston 38 moves relative to the sealing member 56 so as to expand the auxiliary chamber 60 to decrease the pressure therein and to contract chamber 79. As a result fluid from the reservoir 26 and from the chamber 79 flows past a right outer lip 86 to replenish fluid within auxiliary chamber 60. Fluid from chamber 79 passes aperture 82 and opening 36 to communicate with reservoir 26 or auxiliary chamber 60 via lip 78. When the primary piston returns to abut snap ring 52, the auxiliary chamber is opened to the reservoir via recesses 84 and aperture 82.

FIRST ALTERNATE EMBODIMENT

Figure 3:
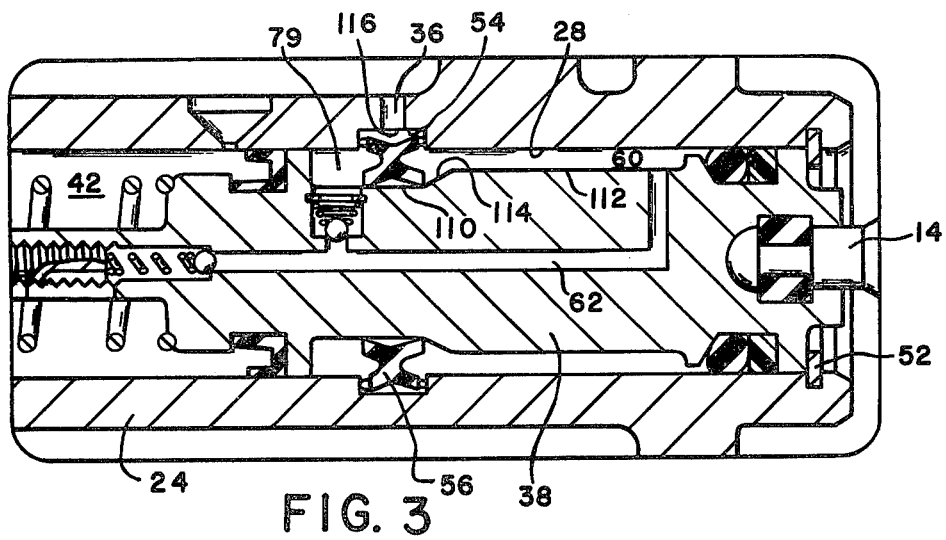
FIG. 3 is an enlarged view similar to FIG. 2 showing a first alternative embodiment.

In FIG. 3, the primary piston 38 includes a first diameter portion 110 and a second diameter portion 112 larger in diameter than the first diameter portion 110. The portions are separated by a ramp 114 and the sealing member 56 is engageable with the first diameter portion when the piston 38 is in the rest position. A clearance is established between the bottom wall 116 of recess 54 and the sealing member 56 when the latter is engageable with the first diameter portion to open communication between the reservoir 26 and the auxiliary chamber 60. When the piston 38 is moved to the left during a braking application, the ramp 114 causes the sealing member to expand to engage the bottom wall 116. During expansion of the resilient member, a small amount of fluid within auxiliary chamber 60 is bled to reservoir. When the sealing member is expanded by the ramp 114 to movably engage the second diameter portion 112, the sealing member engages the bottom wall 116 to seal the auxiliary chamber from the reservoir 26. Consequently, increasing pressurized fluid within auxiliary chamber 60 is communicated to the primary chamber 42 via passage 62 in the same manner as described above.

SECOND ALTERNATE EMBODIMENT

Figure 4:
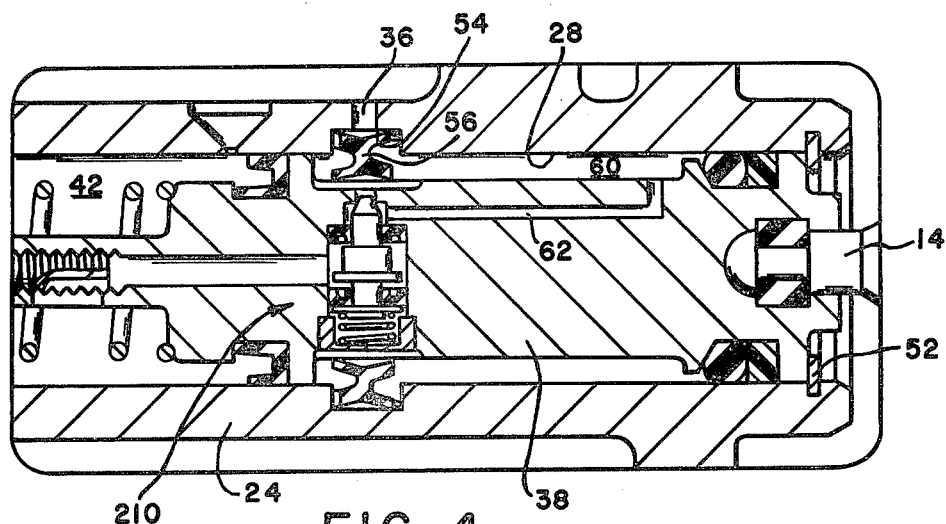
FIG. 4 is an enlarged view similar to FIG. 2 showing a second alternative embodiment.

In FIG. 4, a metering valve assembly 210 is disposed between the auxiliary chamber 60 and the primary chamber 42. The metering valve is responsive to fluid pressure within the primary chamber to maintain the auxiliary chamber open to the reservoir 26 when the pressure level in the primary chamber is above a pedetermined value.

In addition, the metering valve gradually relieves the fluid pressure within the auxiliary chamber to communicate the same to the reservoir, rather than dumping the auxiliary chamber to the reservoir at the predetermined pressure level. The operation of the metering valve assembly is more extensively described in my U.S. Pat. No. 4,254,624.

With respect to all of the embodiments, the bore 28 is substantially uniform in diameter between the primary chamber and the auxiliary chamber and the sealing member 56 is fixed axially within the recess 54. Consequently, the primary piston is movable relative to the sealing member to communicate fluid pressure within the auxiliary chamber to the primary chamber.

I claim:

1. In a fast-fill master cylinder having a housing defining a bore for receiving fluid from a reservoir, a primary piston movably disposed within the bore and a secondary piston movably disposed within the bore and cooperating, respectively, with the primary piston to substantially define a primary chamber and with the housing to substantially define a secondary chamber, the improvement wherein a resilient member is disposed within the bore, the bore forming a recess to fixedly dispose the resilient member therein, said resilient member cooperating with the primary piston to substantially define an auxiliary chamber, the housing bore having the same uniform diameter apart from the recess for said primary pressure chamber, said secondary pressure chamber and said auxiliary chamber, the primary piston substantially defining passage means communicating said auxiliary chamber with said primary pressure chamber, the primary piston being movable relative to said resilient member during a braking application to contract said chambers to communicate fluid pressure from said auxiliary chamber to the primary chamber, and the resilient member cooperates with the recess to define a pair of separate passages, one of the passages communicating fluid from the auxiliary chamber to the reservoir during the initial braking application and the other passage communicating fluid from the reservoir to the auxiliary chamber upon termination of the braking application.

2. The master cylinder of claim 1 in which said resilient member is substantially X-shaped in cross-section and said X-shaped resilient member defines a first pair of opposite legs and a second pair of opposite legs, and said first pair of opposite legs are different in radial dimension than said second pair of opposite legs.

3. The master cylinder of claim 1 in which the piston is stepped to define a first diameter portion and a second diameter portion, said resilient member normally engaging said first diameter portion and being expandible to engage said second diameter portion as the piston is moved during a braking application.

4. The master cylinder of claim 1 in which said resilient member is disposed within a recess on the bore, said resilient member being engageable with a first diameter portion of the piston to form a clearance with the bottom wall of said recess, and said resilient member expanding to engage a second diameter portion of the piston larger than said first diameter portion as the piston moves relative to said resilient member.

5. The master cylinder of claim 4 in which said resilient member is engageable with the bottom wall of said recess when said resilient member is engageable with the second diameter portion.

* * * * *